May 1, 1945. A. PTACEK 2,375,134
CONCENTRATION MIRRORS FOR AIRPLANES
Filed Dec. 11, 1943

INVENTOR
Anna Ptacek
BY
ATTORNEY

Patented May 1, 1945

2,375,134

UNITED STATES PATENT OFFICE 2,375,134

CONCENTRATION MIRROR FOR AIRPLANES

Anna Ptáček, New York, N. Y.

Application December 11, 1943, Serial No. 513,843

5 Claims. (Cl. 88—93)

This invention relates to new and useful improvements in a concentration mirror for airplanes.

The invention has for an object the construction of a device as mentioned which is adapted to be mounted particularly on airplanes, though it may be mounted on other vehicles, and by which different portions of the airplane will be reflected and may be seen by the pilot, as well as the surrounding space.

Still further the invention proposes the provision of a spherical mirror or the like which is capable of reflecting a panorama of portions of the airplane or vehicle, and the surrounding space.

A further object of the invention consists in an arrangement whereby the spherical mirror may be adjusted to various positions so that the pilot may adjust it to see various views.

Another one of the objects resides in the provision of a plurality of reflecting mirrors adapted to coact with the mirror globe to produce the reflecting results desired.

A further object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
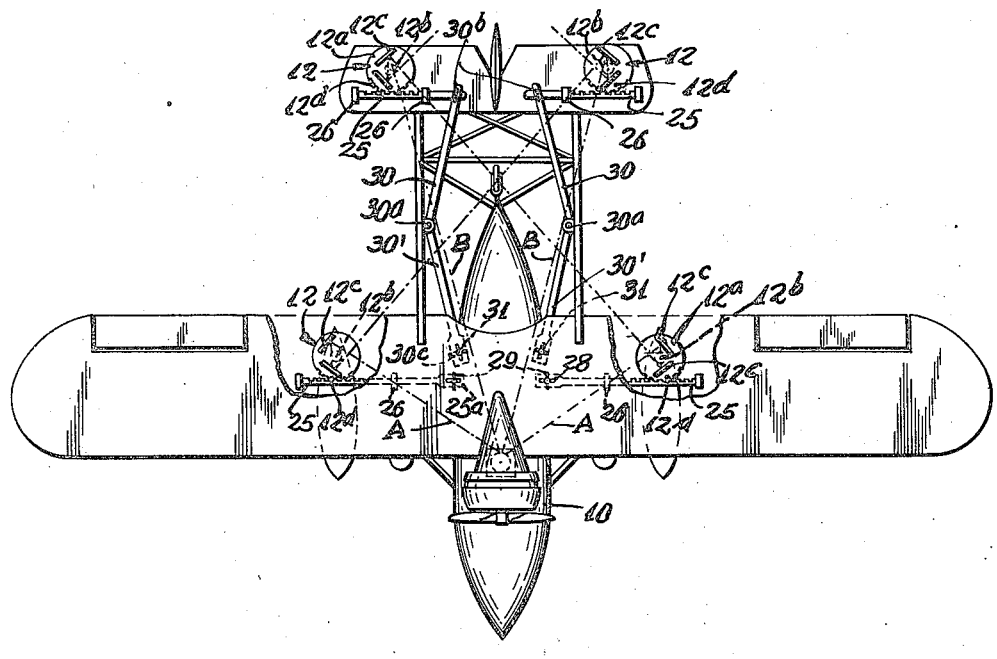
Fig. 1 is a plan view of an airplane equipped with a concentrating mirror according to this invention.
Figure 2:
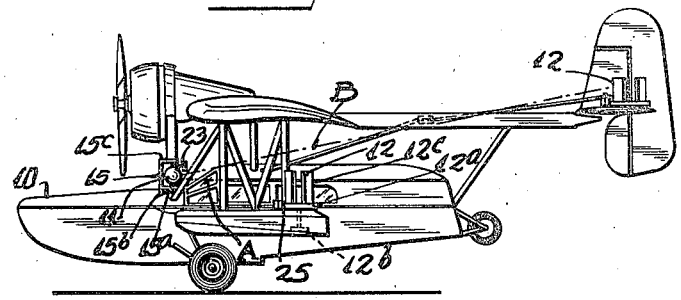
Fig. 2 is a side elevational view of Fig. 1.
Figure 3:
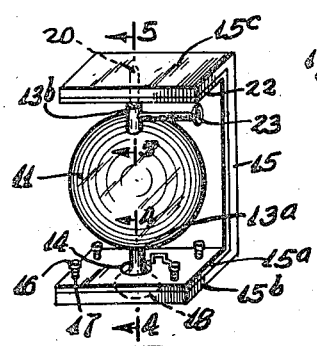
Fig. 3 is a perspective view of the globe mirror and its supporting mechanism, illustrated per se.
Figure 4:
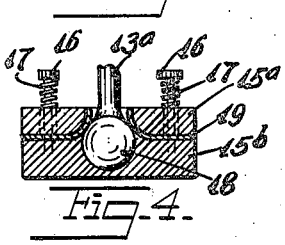
Fig. 4 is a fragmentary sectional view taken on the line 4—4 of Fig. 3.
Figure 5:
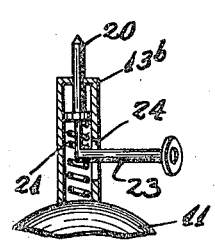
Fig. 5 is a fragmentary sectional view taken on the line 5—5 of Fig. 3.

In Figs. 1 and 2 an airplane 10 is shown of standard construction provided with a mirror globe 11 to the front of the pilot's seat, which is adapted to reflect the images from a plurality of reflecting mirrors 12 located on different portions of the airplane.

The mirror globe 11 is supported upon a trunnion 13 consisting of the trunnion elements 13ª and 13ᵇ. The trunnion element 13ª extends into an opening 14 in the base of a supporting bracket 15. This base is composed of an upper section 15ª and a lower section 15ᵇ. These sections are resiliently connected by headed screws or studs 16 mounted on the lower section 15ᵇ and extending upwards through openings in the upper section. Expansion springs 17 are mounted upon these headed studs. These expansion springs serve to urge the sections together. At the lower end the trunnion element 13 is formed with a spherical member 18 which is supported by the base sections 15ª and 15ᵇ and which acts as a ball and socket joint. A friction element 19 is mounted between the sections 15ª and 15ᵇ and engages a portion of the spherical member 18 for frictionally holding it in fixed positions.

The top trunnion element 13 has a slidably projecting pin 20 which is urged outwards by an expansion spring 21. This pin is adapted to be engaged against felt pad 22 attached upon the underside of the headed portion 15ᶜ of the bracket 15. A handle 23 projects from the trunnion 13 by which it may be readily removed. Specifically, the handle 23 engages through an opening 24 in the trunnion element 13ᵇ and connects with the bottom of the pin 20.

When it is desired to adjust the position of the mirror globe it is merely necessary that the handle 23 be gripped and moved downwards to move the pin 20 out of contact with the pad 22. The globe 11 may then be moved universally. It may be fixed in a new position by releasing the handle 23.

The globe 11 reflects images from a plurality of reflecting mirror devices, indicated generally by the reference numerals 12. Each of these reflecting devices comprises a base disc 12ª which is rotatively supported by a headed stud 12ᵇ. Reflecting mirrors 12ᶜ of about 11″ in diameter are mounted upon the base 12ª and are adapted to reflect portions of the airplane and surrounding scene.

Each of the base elements 12ª are of disc shape and formed with rack teeth 12ᵈ which mesh with racks 25. These racks are slidably supported in suitable bearings 26 upon the airplane. Certain of these racks terminate in end portions 25ª which are formed with elongated openings 28 through which clamping screws project by which they may be fixed in desired positions. Other of these racks are connected with suitable pivotally mounted levers 30 which have ends 30′ projecting to the vicinity of the pilot of the airplane and adapted to be clamped into fixed positions by screws 31. The levers 30 may also be moved by suitable electromagnets.

The pilot may adjust the various reflecting mirrors 12 so that by merely looking into the mirror globe 11 it is possible to see various portions of the airplane and the surrounding vicinity. Because the mirror globe 11 is of spherical form there is a panoramic view which taken in several or all of the reflecting mirrors 12. It is thus possible for the pilot to simultaneously see various portions of the airplane and the surrounding space.

The levers 30 are pivotally supported at the points 30ᵃ. At one of their ends they are engaged by pins 30ᵇ which project from the racks 25. The other ends of the levers 30 are formed with suitable slots 30ᶜ through which the clamping blots 31 extend.

On the drawing the dot and dash lines A and B represent certain of the lines of vision.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new, and desire to secure by United States Letters Patent is:

1. In a device of the class described, a mirror globe, a U-shaped bracket turned on its side and having arms extending across the top and bottom of said globe, top and bottom trunnions extending from diametrically opposite sides of said mirror globe, said bottom trunnion being universally connected with its adjacent arm of said bracket, and means manually adjustably connecting said top trunnion with its adjacent top arm of said bracket.

2. In a device of the class described, a mirror globe, a U-shaped bracket turned on its side and having arms extending across the top and bottom of said globe, top and bottom trunnions extending from diametrically opposite sides of said mirror globe, said bottom trunnion being universally connected with its adjacent arms of said bracket, and means manually adjustably connecting said top trunnion with its adjacent top arm of said bracket, said top trunnion being hollow, and said means, comprising a felt pad attached to the bottom face of said top arm, a pin slidably supported in said top hollow trunnion, and resilient means for extending said pin from the top of said hollow top trunnion to engage said felt pad.

3. In a device of the class described, a mirror globe, a U-shaped bracket turned on its side and having arms extending across the top and bottom of said globe, top and bottom trunnions extending from diametrically opposite sides of said mirror globe, said bottom trunnion being universally connected with its adjacent arm of said bracket, and means manually adjustably connecting said top trunnion with its adjacent top arm of said bracket, said top trunnion being hollow, and said means, comprising a felt pad attached to the bottom face of said top arm, a pin slidably supported in said top hollow trunnion, and resilient means for extending said pin from the top of said hollow top trunnion to engage said felt pad, said resilient means, comprising an expansion spring in said hollow top trunnion and bearing against the inner end of said pin.

4. In a device of the class described, a mirror globe, a U-shaped bracket turned on its side and having arms extending across the top and bottom of said globe, top and bottom trunnions extending from diametrically opposite sides of said mirror globe, said bottom trunnion being universally connected with its adjacent arm of said bracket, and means manually adjustably connecting said top trunnion with its adjacent top arm of said bracket, said top trunnion being hollow, and said means, comprising a felt pad attached to the bottom face of said top arm, a pin slidably supported in said top hollow trunnion, and resilient means for extending said pin from the top of said hollow top trunnion to engage said felt pad, and means for retracting said pin to disengage it from said pad to free said mirror globe to be adjusted about said universally mounted bottom trunnion.

5. In a device of the class described, a mirror globe, a U-shaped bracket turned on its side and having arms extending across the top and bottom of said globe, top and bottom trunnions extending from diametrically opposite sides of said mirror globe, said bottom trunnion being universally connected with its adjacent arm of said bracket, and means manually adjustably connecting said top trunnion with its adjacent top arm of said bracket, said top trunnion being hollow, and said means comprising a felt pad attached to the bottom face of said top arm, a pin slidably supported in said top hollow trunnion, and resilient means for extending said pin from the top of said hollow top trunnion to engage said felt pad, and means for retracting said pin to disengage it from said pad to free said mirror globe to be adjusted about said universally mounted bottom trunnion, comprising a handle extending at right angles from the inner end of said pin and passing through an elongated slot formed in the side of said hollow trunnion.

ANNA PTÁČEK.